(12) United States Patent
Harada

(10) Patent No.: US 8,305,655 B2
(45) Date of Patent: Nov. 6, 2012

(54) IMAGE READING DEVICE AND IMAGE FORMING APPARATUS

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 576 days.

(21) Appl. No.: 12/507,847

(22) Filed: Jul. 23, 2009

(65) Prior Publication Data

US 2010/0020369 A1  Jan. 28, 2010

(30) Foreign Application Priority Data

Jul. 25, 2008 (JP) ................. 2008-192353

(51) Int. Cl.
*H04N 1/04* (2006.01)
*H04N 1/38* (2006.01)

(52) U.S. Cl. ........ 358/475; 358/463; 358/406; 358/496; 358/486; 358/444; 358/497

(58) Field of Classification Search .................. 358/406, 358/504, 496, 498, 474, 296, 3.26, 463; 382/275; 399/9, 11, 15
See application file for complete search history.

(56) References Cited

U.S. PATENT DOCUMENTS 7,667,878 B2 *  2/2010  Korhonen et al. ............ 358/474
2010/0315691 A1 * 12/2010  Nishio .......................... 358/475

FOREIGN PATENT DOCUMENTS

| JP | 3313098 | | 5/2002 |
| JP | 2004297443 | A * | 10/2004 |
| JP | 2006-148677 | | 6/2006 |

* cited by examiner

*Primary Examiner* — Cheukfan Lee
(74) *Attorney, Agent, or Firm* — Gerald E. Hespos; Michael J. Porco

(57) ABSTRACT

An image reading device includes: a foreign-matter image position detection unit that detects a predetermined foreign-matter image from the image read by a document reading unit when the document conveyed by a document conveying unit comes off from a document reading position and detects a main scanning direction position of the foreign-matter image in the main scanning direction; and a lighting control unit that lights up the light-emitting element group arranged in the main scanning direction and lights up the light-emitting elements within a predetermined range from the main scanning direction position of the foreign-matter image in a light emission mode that is different from a light emission mode of other light-emitting elements when the foreign-matter image is detected by the foreign-matter image position detection unit.

12 Claims, 13 Drawing Sheets

SUB-SCANNING DIRECTION

IMAGE READING DEVICE AND IMAGE FORMING APPARATUS

BACKGROUND OF THE INVENTION

1. Field of the Invention

The present invention relates to an image reading device of the so-called sheet-through type in which a document image is read from one main surface side of a transparent document glass, while the document that is the object of reading is conveyed so as to move on the other main surface of the document glass, and to an image forming apparatus equipped with the image reading device.

2. Description of the Related Art

In an image forming apparatus such as a copier, in a case where a document image is read with a sheet-through image reading device and the image is printed, a stripe-like image extending along the sub-scanning direction sometimes appears in the image. This stripe-like image is usually a result of contamination caused by adhesion of foreign matter such as dirt, dust, or paper powder from the conveyed document to the glass (document glass) of the image reading device. Because this stripe-like image appears as a black stripe on the white background of recording paper after printing or as a white stripe in the image zone, a document reading device has been suggested in which, as indicated in Japanese Patent No. 3313098, in a case where the stripe-like image is detected, the document reading position of a scanner provided in the image reading device is moved in the sub-scanning direction, the document is read in a position without the dirt or the like, and the user is warned when the scanner position is changed. Further, as described in Japanese Patent Application Laid-open No. 2006-148677, an image reading device has been suggested in which the contaminated portion on the document glass is lighted and displayed in the illumination mechanism of a scanner and the user is asked to clean the document glass.

SUMMARY OF THE INVENTION

The present invention further improves the above-described conventional technology.

Thus, the present invention provides an image reading device including: a document reading unit having an illumination mechanism, which illuminates a document with a group of a plurality of light-emitting elements arranged side by side in a main scanning direction, and reading optically an image of the document illuminated by the illumination mechanism via a document glass that extends in the main scanning direction in a predetermined document reading position; a document conveying unit that conveys the document in a sub-scanning direction of the document reading unit with respect to the document reading position; a foreign-matter image position detection unit that detects a predetermined foreign-matter image from the image read by the document reading unit when the document conveyed by the document conveying unit comes off from the document reading position and detects a main scanning direction position of the foreign-matter image in the main scanning direction; and a lighting control unit that lights up the light-emitting element group arranged in the main scanning direction and lights up the light-emitting elements within a predetermined range from the main scanning direction position of the foreign-matter image in a light emission mode that is different from that of other light-emitting elements when the foreign-matter image is detected by the foreign-matter image position detection unit.

These and other objects, features and advantages of the present invention will become more apparent upon reading of the following detailed description along with the accompanied drawings.

DETAILED DESCRIPTION OF THE PREFERRED EMBODIMENTS

Figure 1:
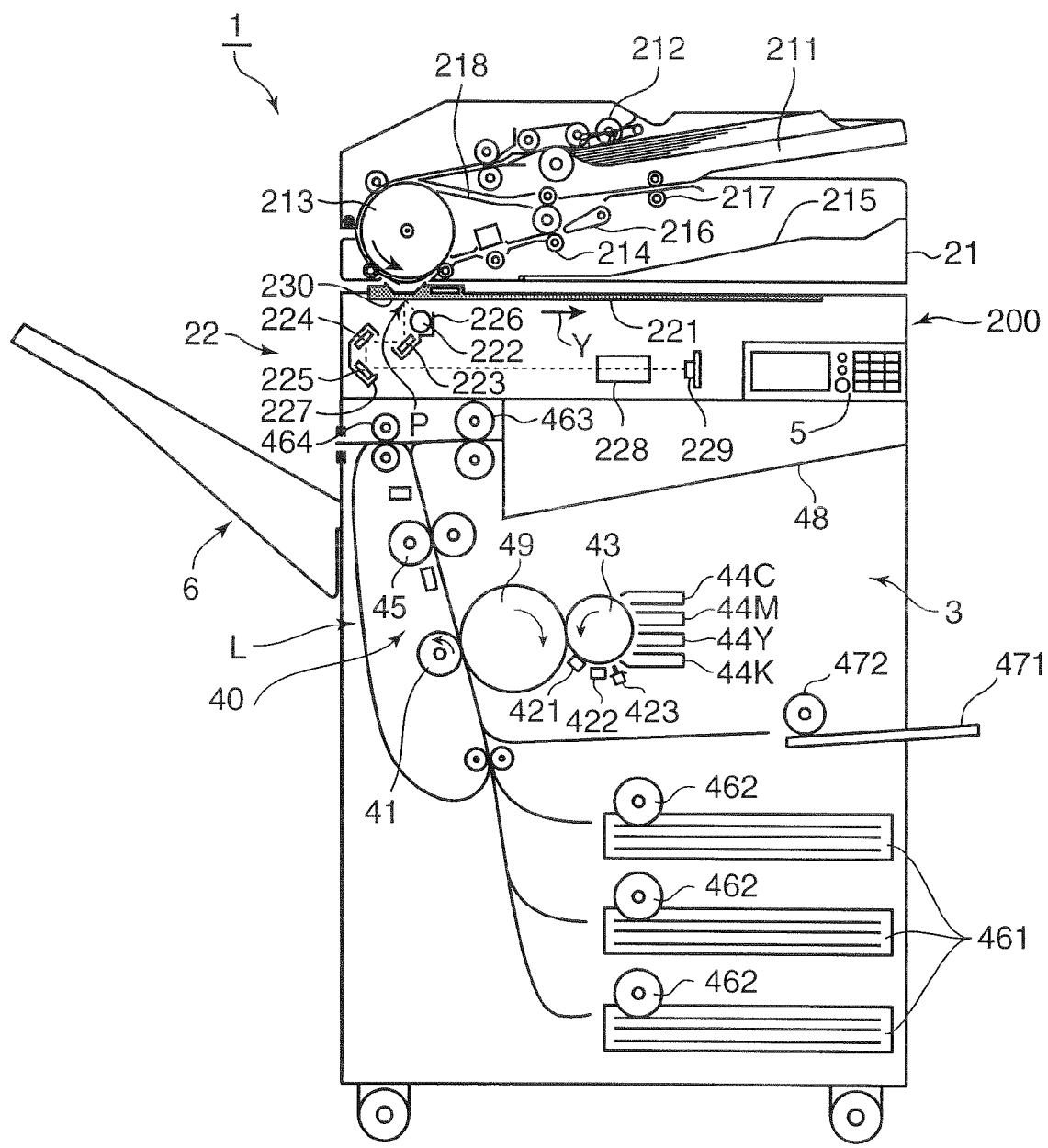
FIG. 1 is a vertical cross-sectional view illustrating schematically the internal configuration of a multi-function peripheral of one embodiment of the image reading device and image forming apparatus in accordance with the present invention.

An image reading device and an image forming apparatus in accordance with the present invention will be described below based on embodiments thereof. In the embodiments below, an example is explained in which the image reading device and image forming apparatus of embodiments of the present invention are implemented as a multi-function peripheral provided with functions of a color copier, a scanner, a facsimile apparatus, and a printer. FIG. 1 is a vertical cross-sectional view illustrating schematically the internal configuration of a multi-function peripheral 1 of one embodiment of the image reading device and image forming apparatus in accordance with the present invention.

The multi-function peripheral 1 is in general configured by a document reading mechanism 200 and a device body 3. The document reading mechanism 200 is provided with a document conveying unit 21, a scanner unit 22, an operation unit 5, and the below-described turnover mechanism and control unit 61 (see FIG. 3). The document conveying unit 21 is provided with an ADF (Automatic Document Feeder) and has a document tray 211, a pick-up roller 212, a conveying drum 213, a paper discharge roller 214, and a paper discharge tray 215. Documents, which are reading objects, are placed on the document tray 211. The documents placed on the document tray 211 are picked up one by one by the pick-up roller 212 and conveyed successively to the conveying drum 213 via a gap. The documents that have passed through the conveying drum 213 are successively discharged by the paper discharge roller 214 to the paper discharge tray 215.

The scanner unit (document reading unit) 22 optically reads an image of the document and generates image data. The scanner unit 22 is provided with a platen glass 221, a light source (illumination mechanism) 222, a first mirror 223, a second mirror 224, a third mirror 225, a first carriage 226, a second carriage 227, an image-forming lens 228, and a CCD (Charge Coupled Device) 229. The scanner unit 22 used a plurality of LED (Light Emitting Diode) that are arranged in the main scanning direction as the light source 222, and the light from the document is guided to the CCD 229 by the first mirror 223, second mirror 224, third mirror 225, first carriage 226, second carriage 227, and image-forming lens 228. The configuration of the light source 222 is described below.

When the document is to be read without the use of the document conveying unit 21, the user manually places the document on the platen glass 221. The light source 222 and first mirror 223 are supported by the first carriage 226, and the second mirror 224 and third mirror 225 are supported by the second carriage 227.

The document reading system of the document reading mechanism 200 can be a flat-bed reading mode in which the document placed on the platen glass 221 is read by the scanner unit 22 and an ADF reading mode in which the document is picked up by the document conveying unit 21 (ADF) and the document is read in the conveying process.

In the flat-bed reading mode, the light source 222 illuminates the document placed on the platen glass 221, and the reflected light of one line in the main scanning direction is successively reflected by the first mirror 223, second mirror 224, and third mirror 225 and falls on the image-forming lens 228. The light that has fallen on the image-forming lens 228 forms an image on a light-receiving surface of the CCD 229. The CCD 229 is a one-dimensional image sensor and simultaneously processes image data of one line of the document. The first carriage 226 and second carriage 227 are configured so that they can move in a direction (sub-scanning direction, direction shown by arrow Y) perpendicular to the main scanning direction, and where the reading of one line is completed, the first carriage 226 and second carriage 227 move in the sub-scanning reaction and reading of the next line is performed.

In the ADF pick-up mode, the document conveying unit 21 picks up one by one with the pick-up roller 212 the documents that have been placed on the document tray 211. In this case, the first carriage 226 and second carriage 227 are disposed in a preset reading position P that is below a document reading window (document glass) 230 that is made from a transparent material such as a glass member. When the document is conveyed by the document conveying unit 21 and the document passes above the document reading window 230 that is provided on the path by which the document moves from the conveying drum 213 to the paper discharge tray 215, the light source 222 illuminates the document, the reflected light of one line in the main scanning direction is successively reflected by the first mirror 233, second mirror 224, and third mirror 225 and falls on the image-forming lens 228. The light that has fallen on the image-forming lens 228 forms an image on the light-receiving surface of the CCD 229. The document is then conveyed by the document conveying unit 21 and the next line is read.

The document conveying unit 21 also has a document turnover mechanism (turnover unit) provided with a switching guide 216, a turnover roller 217, and a turnover conveying path 218. The document turnover mechanism turns over the document that has been read from the front surface (one surface of the document) by the first ADF reading and conveyed again to the document reading window 230, thereby enabling the CCD 229 to read the rear surface (the other surface of the document). The document turnover mechanism operates only when two-side reading is performed and does operate in a case of one-side reading. During one-side reading and after rear-side reading during two-side reading, the switching guide 216 is switched to the upper side, and the document that has passed the conveying drum 213 is discharged by the discharge roller 214 to the discharge tray 215. After front-side reading during two-side reading, the switching guide 216 is switched to the lower side, and the document that has passed the conveying drum 213 is conveyed by the turnover roller 217 to the turnover conveying path 218. The switching guide 216 is then switched to the upper side, the turnover roller 217 is reversed, and the document is again fed to the conveying drum 213.

The multi-function peripheral 1 has the device body 3 and a stack tray 6 installed to the left of the device body 3. The device body 3 is provided with a plurality of paper feed cassettes 461, a paper feed roller 462 that draws out recording paper, sheet by sheet, from the paper feed cassette 461 and conveys the paper to an image forming unit 40, and the image forming unit 40 that forms an image on the recording paper conveyed from the paper feed cassette 461. The device body 3 is also provided with a paper feed tray 471 and a draw-out roller 472 that draws out, one by one, the documents that are placed on the paper feed tray 471 toward the image forming unit 40.

The recording unit (image forming unit) 40 is provided with a neutralizing device 421 that removes residual charges from the surface of a photosensitive drum 43, a charging device 422 that charges the surface of the photosensitive drum 43 after the neutralization, an exposure device 423 that outputs laser light and exposes the surface of the photosensitive drum 43 on the basis of image data acquired by a scanner unit 22 and forms an electrostatic latent image on the surface of the photosensitive drum 43, development devices 44K, 44Y, 44M, 44C that form toner images of various colors, namely, cyan (C), magenta (M), yellow (Y), and black (K) on the photosensitive drum 43 on the basis of the electrostatic latent image, a transfer drum 49 that transfers and superimposes the toner images of various colors that have been formed on the photosensitive drum 43, a transfer device 41 that transfers the toner image located on the transfer drum 49 on paper, and a fixing device 45 that heats the paper having the toner image transferred thereonto and fixes the toner image to the paper. The toners of different colors, namely, cyan, magenta, yellow, and black, are fed from a toner feed container (toner cartridge) that is not shown in the figure. Further, conveying rollers 463 and 464 are provided to convey the recording paper that has passed the image forming unit 40 to the stack tray 6 or discharge tray 48.

In a case where an image is formed on both sides of the recording paper, the image is formed on one side of the recording paper with the image forming unit 40 and then the recording paper is nipped by the conveying roller 463 on the side of the discharge tray 48. In this nipped state of the recording paper, the conveying roller 463 is turned over, the recording paper is switched back, the recording paper is again conveyed to the upstream region of the image forming unit 40 along the paper conveying path L, an image is formed on the other side by the image forming unit 40, and then the recording paper is discharged to the stack tray 6 or discharge tray 48.

Figure 2:
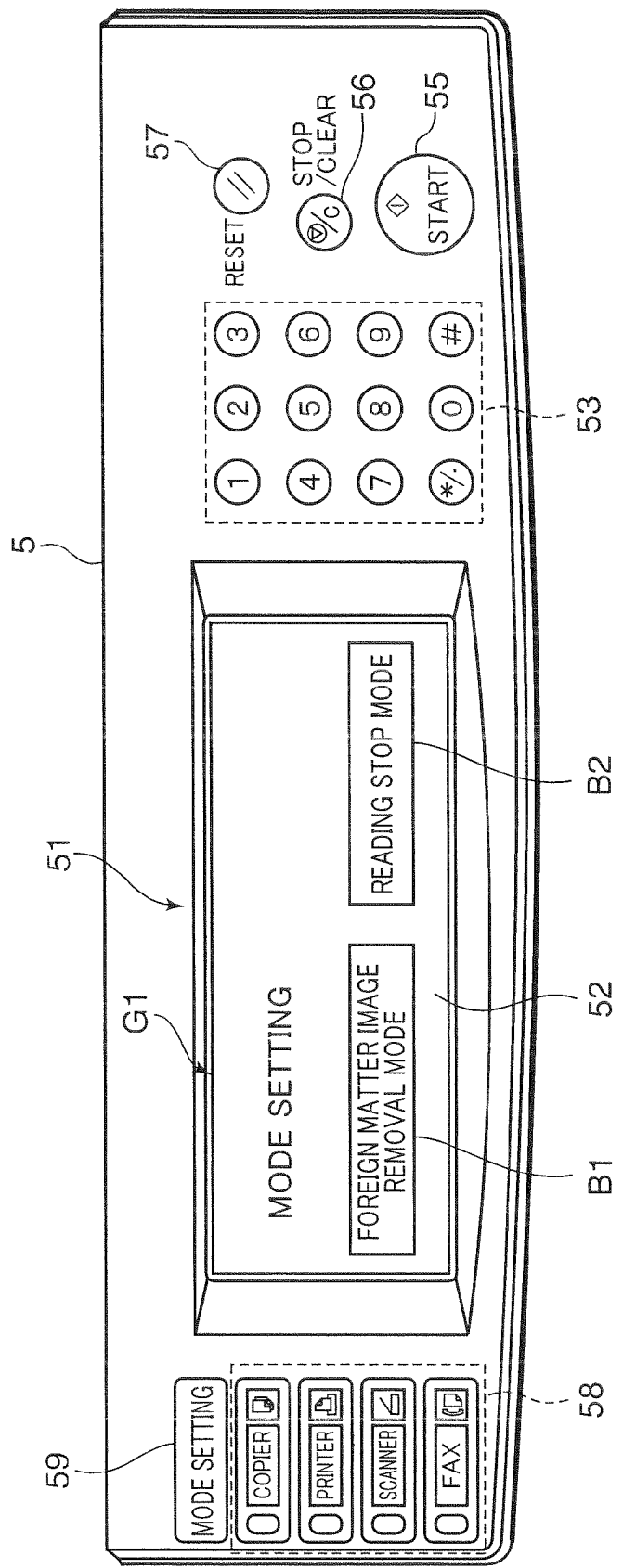
FIG. 2 is an exemplary front view of the operation unit.

A display unit that enables the user to view an operation screen or various messages or an operation unit 5 that has an operation button for inputting various operation commands is provided at the front of the device body 3. FIG. 2 is an exemplary front view of the operation unit 5. The operation unit 5 is provided with a display unit 51, a touch panel 52, a numerical key group 53, various operation buttons 55 to 57, and a function selection button 58. The display unit 51 is constituted by a LCD (Liquid Crystal Display) or an ELD (Electronic Luminescent Display) and displays an operation guide screen that indicates paper size selection, magnification selection, concentration selection, and the like to the user. The display unit 51 is formed integrally with the touch panel 52. The touch panel 52 detects a touch position when the user performs a touch operation and outputs a detection signal indicating the touch position to the below-described control unit 61.

The numerical key group 53 serves, for example, to input the number of documents when a document function of the multi-function peripheral 1 is actuated and to input a phone number of transmission destination when a facsimile function is actuated. A start button 55 serves to initiate the document operation or scanner operation, and a stop/clear button 56 serves to stop the document operation or scanner operation and cancel the inputted operation. A reset button 57 serves to return the display of the display unit 51 or various settings to the initial state or standard state. A function selection button 58 serves for setting a multi-function peripheral function, a printer function, a scanner function, and a facsimile function.

Figure 3:
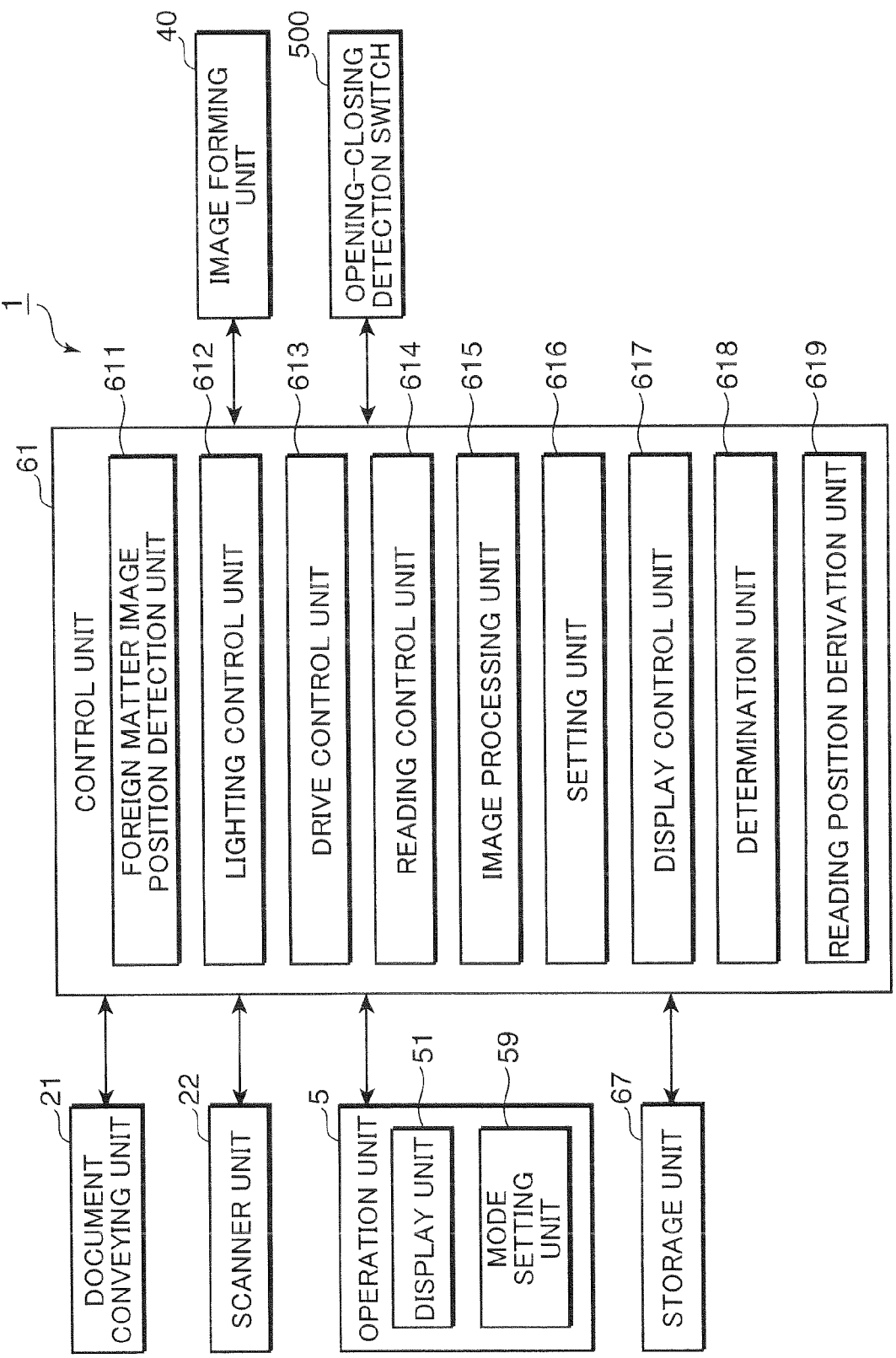
FIG. 3 is a block diagram illustrating an electric configuration of the multi-function peripheral.

FIG. 3 is a block diagram illustrating an electric configuration of the multi-function peripheral 1. Components identical to those shown in FIGS. 1 and 2 are assigned with identical reference numerals and explanation thereof is herein omitted. The multi-function peripheral 1 is constituted by the document conveying unit 21, scanner unit 22, operation unit 5, image forming unit 40, storage unit 67, and control unit 61.

The document conveying unit 21 automatically picks up a document placed on the document tray 211 when copying or scanning is performed in the aforementioned ADF reading mode and conveys the document to enable the reading thereof with the CCD 229.

The operation unit 5 is used to enable the user to perform operations relating to the copier function, printer function, facsimile function, and scanner function and provides the operation commands (command) of the user to the control unit 61. The operation unit 5 includes the display unit 51 that has a touch panel or the like and the stack button 55 or numerical key group 53 that allow the user to perform a variety of instruction inputs such as a copying execution start command or facsimile transmission start command.

The image forming unit 40 forms on the recording paper an image based on image data obtained with the CCD 229 or image data transferred from the personal computer or facsimile device.

The storage unit 67 stores image data obtained by a reading operation of the scanner unit 22 or image data processed by the below-described control unit 61, or stores in advance a communication destination name in an abbreviated register form or facsimile number when facsimile communication is performed, or an IP address of communication party when the device is used as a network scanner, or sub-scanning direction position information of a light source 222 where the illumination light is not present with respect to a position at a predetermined distance from the document glass provided in the document reading window 230.

An opening-closing detection switch 500 is provided outside the platen glass 221 on the upper surface portion of the device body 3. This switch detects the open-closed state of the document conveying unit 21 and outputs the detected state to the control unit 61 (lighting control unit 612).

The control unit 61 controls the operation of the entire multi-function peripheral 1 and is constituted by CPU, a RAM, and a ROM. The document conveying unit 21, the scanner unit 22, the operation unit 5, an image processing unit 615, and an image forming unit 40 operate under control by the control unit 61. The control unit 61 executes the processing based on an operation control program stored in the ROM (not shown in the figure) or the aforementioned storage unit 67 correspondingly to various instruction signals inputted by the user into the operation unit 5, performs output of the instruction signals and data transfer to the functional units, and performs unified control of the multi-function peripheral 1.

In the multi-function peripheral 1 of the above-described configuration, in a case where a document conveyed by the document conveying unit 21 in the ADF mode is read by the document reading mechanism 200, where a foreign matter adheres to the document reading window 230, an image of the foreign matter is picked up by the same pixel in the scanner unit 22 at respective imaging timing. As a result, a stripe-like image (line L in FIG. 4; referred to hereinbelow as "foreign-matter image") that extends in the sub-scanning direction can be formed in a position in the main scanning direction that corresponds to the pixel position of the aforementioned same pixel in the image obtained.

Where such a state is allowed to stay till the reading operation of all the documents of the document stack is completed, the foreign-matter image will be generated in all the images obtained in the reading operation and documents that are undesirable for the user will be produced. The multi-function peripheral 1 of the present embodiment uses the below-described configuration to resolve this problem.

Thus, in addition to the usual image reading operation (image reading operation relating to a document) with respect to each document, the multi-function peripheral 1 performs a reading operation at a timing before a predetermined position set between (or space between) the present document and an immediately preceding document (or immediately following document) reaches the reading position P (that is, including the timing before the usual image reading operation is started). In other words, as shown in FIG. 4, in addition to performing the usual image reading operation with respect to $n^{th}$ documents (n is integer equal to or greater than 1), the multi-function peripheral 1 also performs a respective reading operation in a predetermined position Cn−1 between a rear edge of the (n−1)-th document and a leading edge of the n-th document (or in a predetermined position Cn+1 between a rear edge of the n-th document and a leading edge of the (n+1)-th document).

Then, the multi-function peripheral 1 determines whether image data generated by the foreign matter (referred to hereinbelow as foreign-matter image data) are contained in the image data obtained in the reading operation and detects a position of the foreign matter (in particular, a position in the main scanning direction) on the basis of the foreign-matter image data in a case where the foreign-matter image data are determined to be contained.

Figure 4:
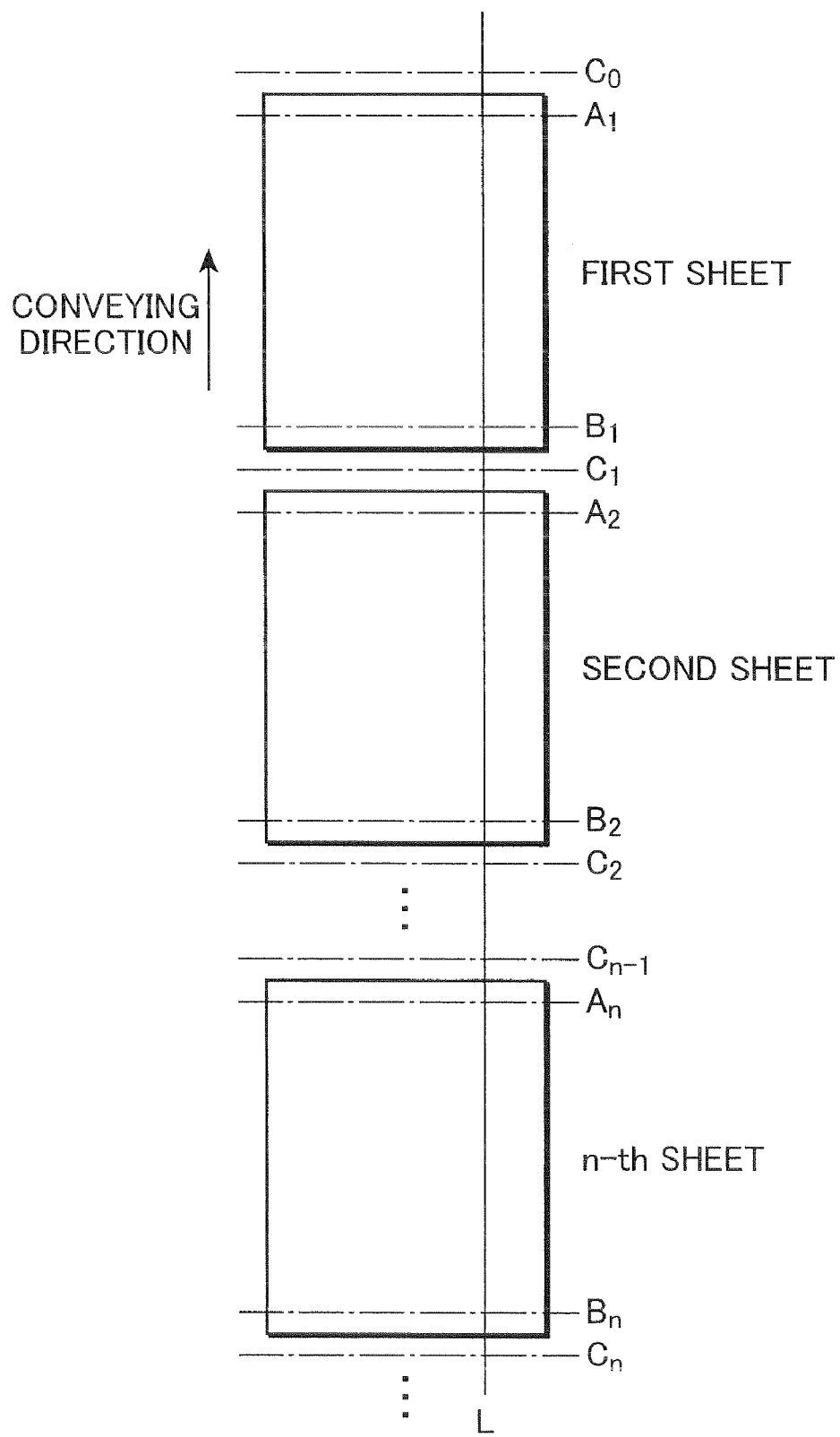
FIG. 4 illustrates an arrangement state of documents that are conveyed successively by the document conveying unit to the reading portion, under an assumption that the document conveying path along which the document is conveyed by the document feeder to the reading position is approximately linear.

In FIG. 4, a path along which the documents are conveyed to the reading position P by the document conveying unit 21 is assumed to be a straight line and a state is shown in which the documents that are sequentially conveyed by the document conveying unit 21 to the reading position P are arranged in a row.

In this case, the multi-function peripheral 1 has two modes as operation modes of each unit in a case where the foreign-matter image data are detected. Thus, the multi-function peripheral 1 has a foreign-matter image removal mode in which image processing for removing the foreign-matter image (the below-described foreign-matter image removal processing) is performed on the basis of image data obtained in the reading operation of the scanner unit 22 and an image is formed on the recording paper or data are saved on the basis of image data after the image processing, and a reading stop mode in which the reading operation is interrupted and a location of the foreign matter is made known, without performing the foreign-matter image removal processing.

The multi-function peripheral 1 of the present is configured so that the user can select the desired mode from the above-described two modes. This mode selection can be performed, for example, on a mode selection screen G1 shown in FIG. 2. By performing a predetermined operation with respect to the operation unit 5, the user displays the mode selection screen G1 shown in FIG. 2 at the display unit 51.

As shown in FIG. 2, the mode selection screen G1 has displayed thereon a foreign-matter image removal mode setting button B1 for selecting the foreign-matter image removal mode in which image processing is performed to remove the foreign-matter image when the foreign-matter image is detected and a reading stop mode setting button B2 for selecting a mode in which the reading operation is interrupted and a location of the foreign matter is made known when the foreign-matter image is detected. Where the foreign-matter image removal mode setting button B1 or reading stop mode setting button B2 is pushed, a mode instruction signal that indicates a mode corresponding to the button is outputted from the touch panel 52 to the control unit 61.

In order to realize the above-described function, as shown in FIG. 3, the control unit 61 has functions of a foreign-matter image position detection unit 611, a lighting control unit 612, a drive control unit 613, a reading control unit 614, an image processing unit (image removal processing unit) 615, a setting unit 616, a display control unit 617, a determination unit 618, and a reading position derivation unit 619.

The foreign-matter image position detection unit 611 detects a predetermined foreign-matter image from the image read by the scanner unit 22 in a state in which a document conveyed by the document conveying unit 21 comes off from the document glass of the document reading position 230 (before the document is sent, or between a document that has been heretofore sent and the document that will be set thereafter) and detects the main scanning direction position of the foreign-matter image in the main scanning direction of the scanner unit 22.

The foreign-matter image position detection unit 611 detects the presence of foreign-matter image generated by the foreign matter and detects indirectly the presence of foreign matter on the document glass on the basis of image data obtained in the reading operation performed by the scanner 22. As mentioned hereinabove, because the surface of the conveying drum 213 that faces the document reading window 230 is a monochromatic white surface, in the reading operation performed at a timing in which the position Cn−1 passes by the reading position P, this white surface is irradiated by the light from the light source 222 of the scanner unit 22.

Therefore, in a case where no foreign matter is present on the document glass (document reading window 230) at a timing in which the position Cn−1 passes by the reading position P, image data of one line in the main scanning direction that are obtained at this timing have a comparatively large pixel value corresponding to white color uniformly in the main scanning direction.

In a case where foreign matter is present on the document reading window 230 at a timing in which the position Cn−1 passes by the reading position P, image data of one line in the main scanning direction that are obtained at this timing include image data with a pixel value reduced by the foreign matter among the image data with comparatively large pixel values.

Based on this information, the foreign-matter image position detection unit 611 performs a processing of detecting an image (referred to hereinbelow as "foreign-matter image") caused by the foreign matter. Thus, the foreign-matter image position detection unit 611 determines whether pixel data with a pixel value below a predetermined threshold are present among pixel data with comparatively larger pixel values with respect to image data obtained by the reading operation performed at a timing in which the position Cn−1 passes by the reading position P, and when pixel data with a pixel value below a predetermined threshold are present among pixel data with comparatively larger pixel values, the foreign-matter image position detection unit detects the image data with a pixel value below a predetermined threshold as foreign-matter image data.

The foreign-matter image position detection unit 611 then analyzes which pixels of the scanner unit 22 that are arranged in a row in the main scanning direction generate the pixel data constituting the foreign-matter image and detects the position of the foreign-matter image in the main scanning direction.

The lighting control unit 612 controls the lighting of the light source 222 of the scanner unit 22. In a case where the foreign-matter image is detected by the foreign-matter image position detection unit 611, the lighting control unit 612 lights up a group of light-emitting elements of the light source 222 that are arranged in a row in the main scanning direction and also lights up the light-emitting elements provided in a predetermined range from the main scanning direction position of the foreign-matter image in a light emission mode that is different from that of other light-emitting elements. The different light emission modes, as referred to herein, for example, include: (1) a mode in which the quantity of light of the light-emitting elements provided in the predetermined range is larger than that of other light-emitting elements; (2) a mode in which the light-emitting elements provided in the predetermined range are dimmed, whereas other light-emitting elements emit light at a normal level; and (3) a mode in which the emission amount of the light-emitting elements provided in the predetermined range is periodically increased and decreases, whereas other light-emitting element emit light at a constant emission amount at all times.

A drive control unit 613 drive controls a moving mechanism configured, for example, by a motor (not shown in the figure) that moves the first carriage 226 and second carriage 227 of the scanner unit 22 in the sub-scanning direction (direction perpendicular to the main scanning direction) of the scanner unit 22. The moving mechanism is provided at the document reading mechanism 200.

The reading control unit 614 controls the document reading operation of the scanner unit 22. The reading control unit 614 controls the reading operation of each unit of the document reading mechanism 200, for example the document conveying unit 21 and scanner unit 22. In particular, in the present embodiment, the reading control unit 614 causes the scanner unit 22 to perform the usual image reading operation for each document and additionally causes the scanner unit 22 to perform a reading operation at a timing at which the position Cn−1 (n is integer equal to or greater than 1) passes by the reading position P.

The image processing unit 615 performs image processing relating to image data. For example, the image processing unit 615 performs correction processing such as shading correction, level correction, gamma correction, color aberration correction, MTF (Modulation Transfer Function) correction, and scanner color correction, image data compression or expansion processing, and image processing such as enlargement and reduction processing with respect to image data acquired by the CCD 229 or image data transferred from a personal computer connected to the network or a facsimile apparatus connected to the public circuit.

Where the foreign-matter image is detected by the foreign-matter image position detection unit 611, the image processing unit 615 implements a foreign-matter image removal processing for removing the foreign-matter image with respect to the image data corresponding to the abovementioned mode that has been set. A well-known image processing such as a processing in which an average of a plurality of image data constituting the images positioned around the foreign-matter image is computed and the average data are used instead of the foreign image data can be used as the foreign-matter image removal processing.

The setting unit 616 sets a mode of the multi-function peripheral 1 on the basis of a mode instruction signal outputted by the operation unit 5 when the above-described foreign-matter image removal mode setting button B1 or reading stop mode setting button B2 on the touch panel 52 is operated by the user. Thus, (a) when the foreign-matter image removal mode is indicated by the mode instruction signal, where foreign matter is detected by the foreign-matter image position detection unit 611, the foreign-matter image removal processing is performed with respect to the image obtained by the document reading operation performed by the scanner unit 22, and an image is formed on the recording paper or the image is saved based on the image after the image processing; and (b) when the reading stop mode is indicated by the mode instruction signal, where foreign matter is detected by the foreign-matter image position detection unit 611, the reading operation performed by the scanner unit 22 is stopped and the location of foreign matter is notified to the light source 222 of the document reading unit 22, without performing the foreign-matter image removal processing.

The display control unit 617 drive controls the display unit 51 and, for example, causes the display unit 51 to display the foreign-matter image removal mode setting button B1 or reading stop mode setting button B2 and also causes the display unit 51 to display or not display an instruction input button (FIG. 13) that serves to receive from the user an instruction to stop the lighting of the light-emitting element group of the light source 222 of the scanner unit 22 when the foreign-matter image position detection unit 611 performs foreign image detection.

The determination unit 618 determines whether the processing of removing the foreign-matter image by the image processing unit 615 can be performed. For example, the determination unit 618 determines whether the foreign-matter image detected by the foreign-matter image position detection unit 611 is constituted by a pixel group confined in a region of the predetermined range, in a case where the foreign-matter image is constituted by a pixel group confined in this range, the determination unit determines that the processing of removing the foreign-matter image by the image processing unit 615 can be performed. In a case where the foreign-matter image is constituted by a pixel group that is not confined in this region of the aforementioned range, the determination unit determines that the processing of removing the foreign-matter image by the image processing unit 615 cannot be performed. However, the determination unit 618 may determine whether the foreign-matter image removal processing is possible based on whether the foreign-matter image present in one continuous region is constituted by a pixel group confined in the aforementioned range, and also may determine whether the foreign-matter image removal processing is possible based on whether the sum total region of a pixel group of the foreign-matter images present in a plurality of different regions is confined in the range.

Figure 5:
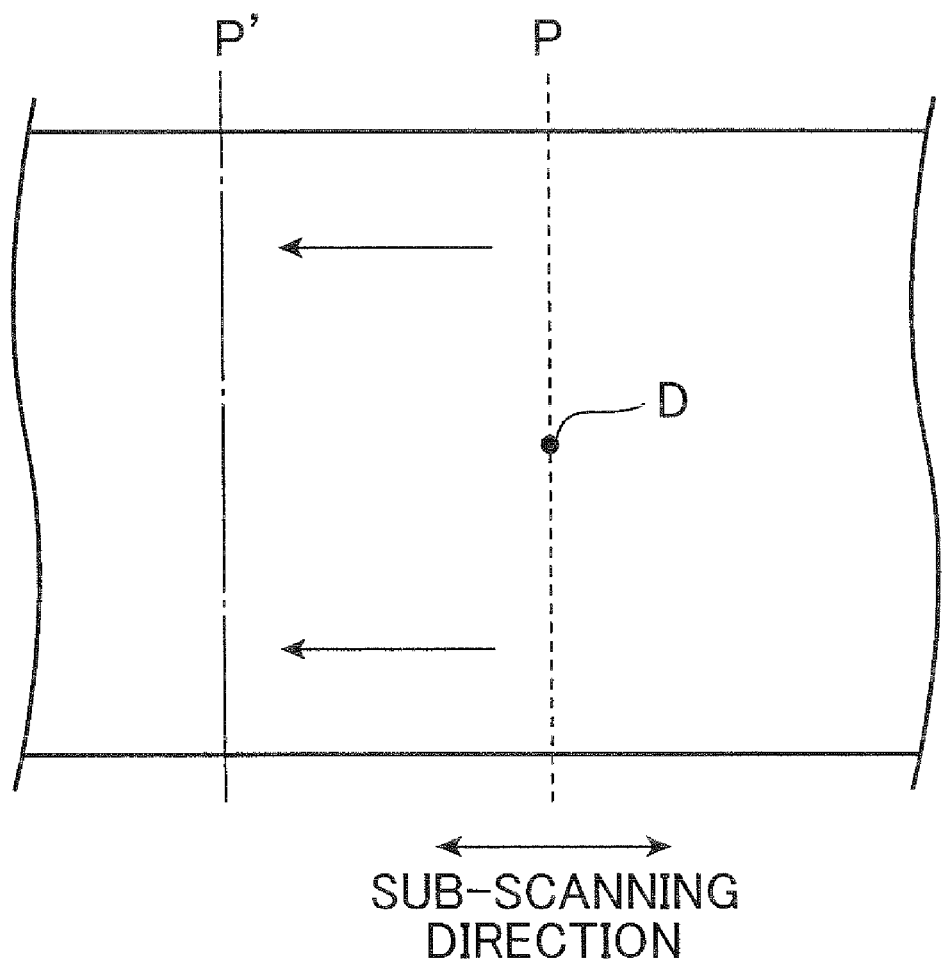
FIG. 5 shows how the position of reading with the document reading unit is changed from the reading position P to the reading position P' in a case where foreign matter D is present in the reading position P.

In a case where the foreign-matter image is detected by the foreign-matter image position detection unit 611, the reading position derivation unit 619 detects a sub-scanning direction position in which foreign matter has hot adhered within the document reading window 230 and derives this position as a change destination of reading position of the scanner unit 22. FIG. 5 shows a state in which the reading position of the scanner unit 22 is changed from the reading position P to the reading position P' when foreign matter D is present in the reading position P.

Figure 6:
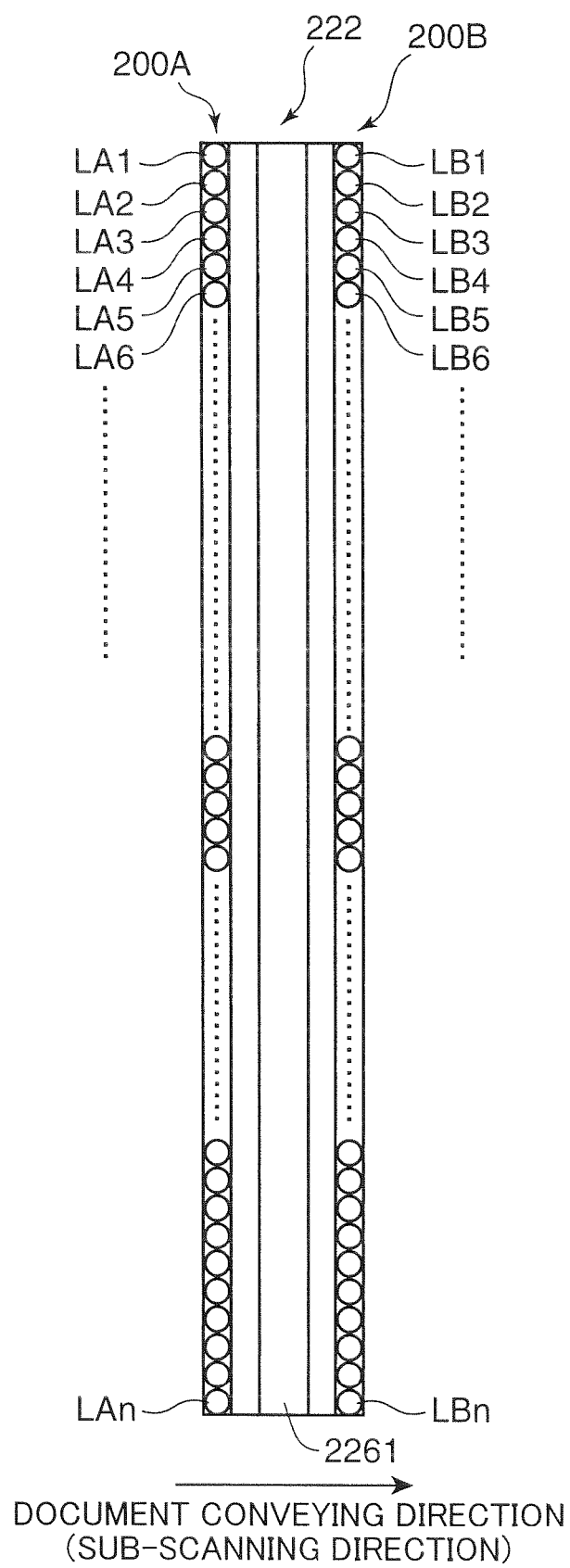
FIG. 6 is a top view of the light source.

The configuration of the light source 222 of the scanner unit 22 will be explained below. FIG. 6 is a top view of the light source 222 and FIG. 7 is a side sectional view in which the light source 222 and document glass are extracted.

As shown in FIG. 6, in the light source 222, light-emitting element groups in which a plurality of light-emitting elements (for example, composed by LED (Light Emitting Diode)) are provided side by side in the main scanning direction are provided in two rows arranged in the sub-scanning direction, which is a document conveying direction in which the documents are conveyed by the document conveying unit 21. The respective light-emitting element groups are denoted by reference symbols 200A and 200B. As described hereinabove, the light source 222 illuminates the document that has been conveyed to the document reading window 230, and when the document is read, the document that has been conveyed to the document reading position is illumined by both light-emitting element groups 200A and 200B of the two rows.

Figure 7:
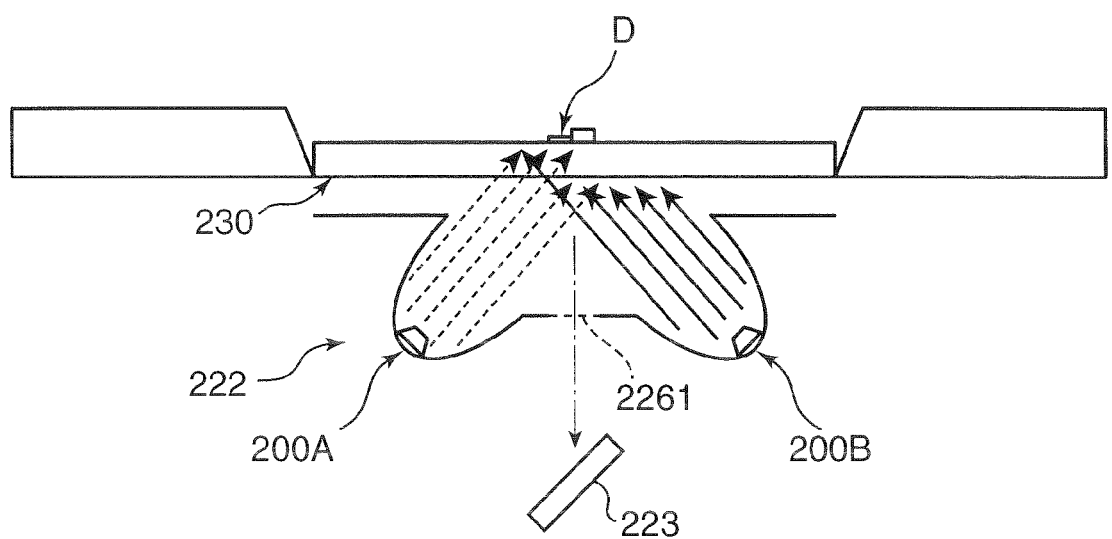
FIG. 7 is a side sectional view in which the light source and document glass are extracted.

As shown in FIG. 7, in the light-emitting element group 200A located on the upstream side in the document conveying direction, the light-emitting elements LA1 . . . LAn are oriented so as to emit light toward the downstream side in the document conveying direction. In the light-emitting element group 200B located on the downstream side in the document conveying direction, the light-emitting elements LB1 . . . LBn are oriented so as to emit light toward the upstream side in the document conveying direction. The orientation of the light-emitting elements LA1 . . . LAn and light-emitting elements LB1 . . . LBn and the height position of the light source 222 are set such that the illumination light of the light-emitting elements LA1 . . . LAn and the illumination light of light-emitting elements LB1 . . . LBn are united in a position of the document reading window 230 (document glass).

Further, when a foreign-matter image is detected by the foreign-matter image position detection unit 611, the light-emitting element group 200A on the upstream side in the document conveying direction is mainly used for illuminating the contamination (dirt, dust, defects, and the like) detected on the document glass. The light-emitting element group 200B on the downstream side in the document conveying direction is used for illuminating the entire document glass extending in the main scanning direction.

When the foreign-matter image is detected by the foreign-matter image position detection unit 611, the moving mechanism of the light source 222 is driven by the drive control unit 613 and moved to a position (sub-scanning direction position of the light source 222 in which the illumination light does not reach the position at the predetermined distance from the document glass) indicated by the sub-scanning direction position information that has been stored in the storage unit 67, and then the below-described lighting of the light-emitting element groups 200A and 200B is performed by the lighting control unit 612. The position at the predetermined distance from the document glass, as referred to herein, is a height position of the user's eyes with respect to the height position of the document glass in a case where the user of a standard height is assumed to look on the document glass from above the document glass. In this case, for example, the position of the user's eyes is directly above the document glass, the light source 222 is moved by the drive control unit 613 in the sub-scanning direction from the document illumination position during document reading to a position indicated by the sub-scanning direction position information, this position being on the downstream side or upstream side in the document conveying direction, and then the above-mentioned lighting control is performed by the lighting control unit 612 in a case where contamination is detected on the document glass.

As shown in FIGS. 6 and 7, a slit 2261 is provided in a position on the first carriage 226 between the light-emitting element groups 200A and 200B in the sub-scanning direction. A first mirror 223 is disposed below the slit 2261, and the image illuminated by the light-emitting element groups 200A and 200B through the slit 2261 is read by the CCD 229 via the first mirror 223, second mirror 224, third mirror 225, and converging lens 228.

Figure 8:
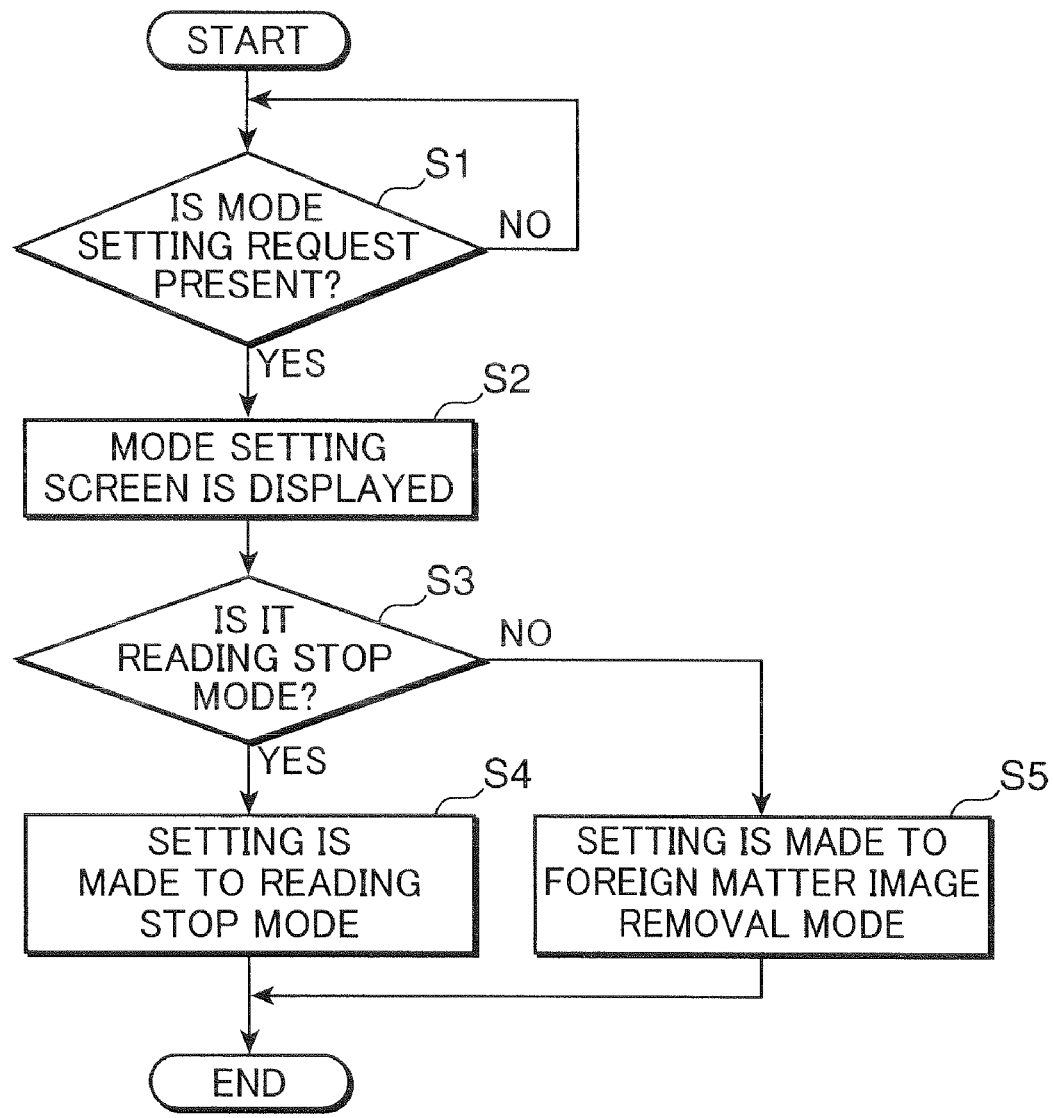
FIG. 8 is a flowchart illustrating the mode setting processing.

The processing of contamination detection on the document glass and contamination notification in the multi-function peripheral 1 will be described below. First, the mode setting processing will be explained. FIG. 8 is a flowchart illustrating the mode setting processing.

As described hereinabove, the multi-function peripheral 1 is provided with a foreign-matter image removal mode in which image processing is performed to remove the foreign-matter image and a reading stop mode in which the reading operation performed by the scanner unit 22 is interrupted and the location of the foreign matter is notified to the user, without performing the image processing that removes the foreign-matter image, as operation modes used in a case where the foreign-matter image is detected in the image read with the scanner unit 22.

For example, where the user pushes the mode setting button 59 (FIG. 2) of the operation unit 5, an instruction causing the display control unit 617 to display the mode setting screen in the display unit 51 is received by the display control unit 617 (YES in S1). In this case, the display control unit 617 causes the display unit 51 to display the mode setting screen G1 such as shown in FIG. 2 (S2). In a case where the reading stop mode setting button B2 for selecting the reading stop mode is pushed by the user in the mode setting screen G1 (YES in S3), the setting unit 616 sets a mode to be used during contamination detection in the multi-function peripheral 1 to the reading stop mode (S4). By contrast, in a case where the user pushes the foreign-matter image removal mode setting button B1 for selecting the foreign-matter image removal mode (NO in S3), the setting unit 616 sets a mode to be used during contamination detection in the multi-function peripheral 1 to the foreign-matter image removal mode (S5).

Figure 9:
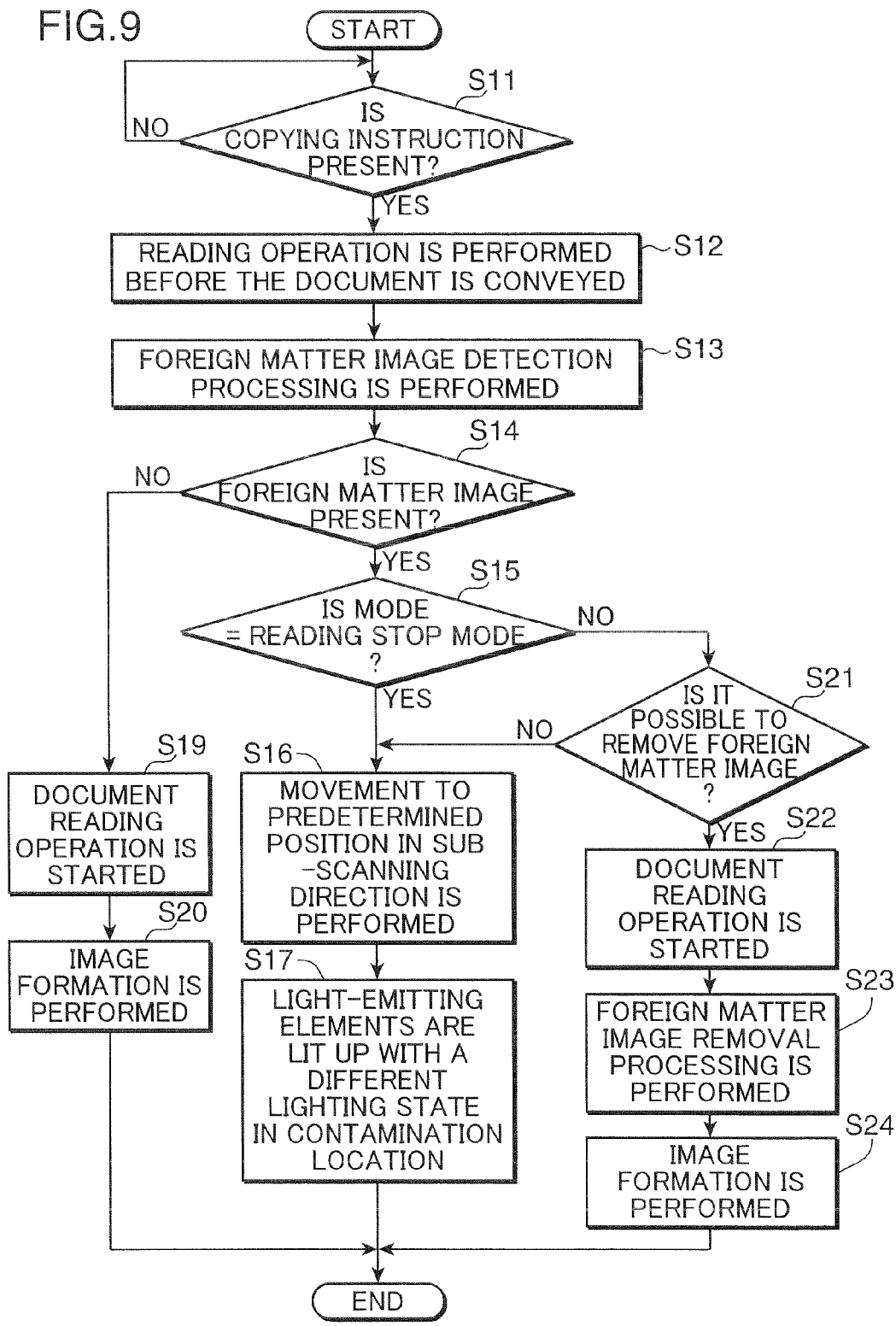
FIG. 9 is a flowchart illustrating the first embodiment of contamination detection on the document glass and contamination notification processing in the multi-function peripheral.

The contamination detection on the document glass and contamination notification processing performed with the multi-function peripheral 1 will be explained below. FIG. 9 is a flowchart showing the first embodiment of contamination detection on the document glass and contamination notification processing performed with the multi-function peripheral 1.

Where, for example, a copying operation start instruction is inputted with the start button 55 (YES in S11), the reading control unit 614 causes the scanner unit 22 to read the image on document glass prior to causing the document conveying unit 21 to convey the document located on the document tray 211 (S12). Then, the foreign-matter image position detection unit 611 performs a processing of detecting the foreign-matter image from the image that has been read by the scanner unit 22 (S13). In step S13, in a case where the foreign-matter image position detection unit 611 has detected the foreign-matter image, this unit also detects the main scanning direction position of the foreign-matter image.

In a case where the foreign-matter image position detection unit 611 has not detected the foreign-matter image from the image that has been read by the scanner unit 22 (NO in S14), the reading control unit 614 causes the scanner unit 22 to perform a document reading operation for the usual copying operation (S19) and the control unit 61 causes the image forming unit 40 to perform an image forming operation based on the image obtained in the document reading operation (S20).

In a case where the foreign-matter image position detection unit 611 has detected the foreign-matter image from the image that has been read by the scanner unit 22 (YES in S14), the control unit 61 determines whether the mode of the multi-function peripheral 1 that has been presently set by the setting unit 616 is a reading stop mode or a foreign-matter image removal mode (S15).

Where the control unit 61 determines that the mode that has been presently set is a reading stop mode (YES in S15), the drive control unit 613 causes the moving mechanism to move the first carriage 226 and the second carriage 227 to the sub-scanning direction position indicated by the sub-scanning position information stored in the storage unit 67 (S16). Then, the lighting control unit 612 causes all the light-emitting elements of the light-emitting element groups 200A and 200B to emit light and illuminate the document glass and also lights up the light-emitting elements provided in the above-mentioned fixed range in the vicinity of the main scanning direction position of the detected foreign-matter image, from among the light-emitting elements LA1 . . . LAn of the light-emitting element group 200A, in any one of the above-described light emission modes (1) to (3) (S17).

As a result, where the user rotates the document conveying unit 21 upward and opens up the document glass from above, the lighting of the light-emitting elements in the main scanning direction position where the foreign matter is present makes it possible to grasp the contamination position on the document glass and also grasp the contamination in other locations on the document glass.

By contrast, where the control unit 61 determines that the mode that has been presently set is a foreign-matter image removal mode (NO in S15), the determination unit 618 performs the above-described determination processing of determining whether the foreign-matter image removal processing with the image processing unit 615 is possible, this determination being conducted on the basis of the size of the region where the detected foreign-matter image is present (S21). In this case where the determination unit 618 determines that the foreign-matter image removal processing of the foreign-matter image is impossible (NO in S21), the processing flow moves to S16.

In a case where the determination unit 618 determines that the foreign-matter image processing of the foreign-matter image is possible (YES in S21), the reading control unit 614 causes the document conveying unit 21 and scanner unit 22 to perform the document reading operation for the usual copying operation (S22), and the image processing unit 615 performs the foreign-matter image removal processing with respect to the image that has been read (S23). The control unit 61 causes the image forming unit 40 to form an image on the recording paper on the basis of the image after the foreign-matter image removal processing has been removed (S24).

As a result, where the contamination of the document glass is very small and the foreign-matter image can be eliminated by image processing, the user can perform the document reading and image formation directly, without stopping the document reading operation, and where the document glass contamination is significant and the cancelation of the foreign-matter image by image processing is insufficient, the document reading operation can be stopped, the user can be notified about the position of contamination on the document glass and the user can perform wiping or the like in the contamination position.

Figure 10:
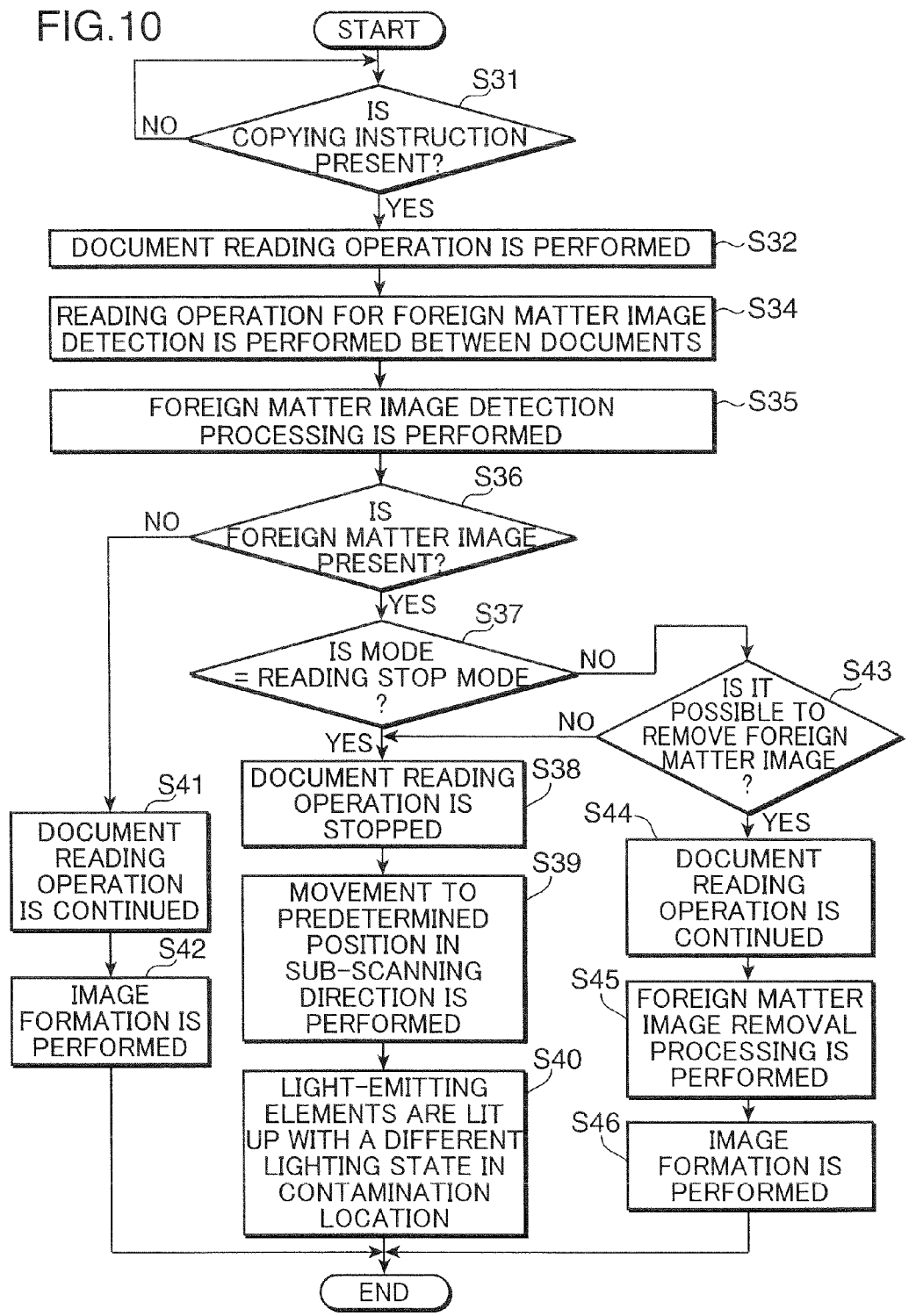
FIG. 10 is a flowchart illustrating the second embodiment of contamination detection on the document glass and contamination notification processing in the multi-function peripheral.

The second embodiment of the contamination detection on the document glass and contamination notification processing performed with the multi-function peripheral 1 will be explained below. FIG. 10 is a flowchart showing the second embodiment of the contamination detection on the document glass and contamination notification processing performed with the multi-function peripheral 1. The explanation of processing similar to that of the first embodiment is herein omitted.

In the first embodiment, the contamination detection on the document glass and contamination notification processing are performed before the document reading operation in the copying operation is started, but in the second embodiment the contamination detection on the document glass and contamination notification processing are performed after the document reading operation in the copying operation has been started.

In the second embodiment, for example, where the copying operation start instruction is inputted from the start button 55 (YES in S31), the reading control unit 614 causes the document conveying unit 21 to convey a document located on the document tray 211 and starts the document reading with the scanner unit 22 (S32). The reading control unit 614 causes the scanner unit 22 to read the image on the document glass for foreign-matter image detection at a timing (Cn−1 or others shown in FIG. 4) within an interval in which each document is conveyed to the document reading window 230 (document glass) by the document conveying unit 21 (S34). In parallel with other processing operations that have to be performed during the copying operation, the processing of detecting the foreign-matter image from the image read with the scanner unit 22 is performed by the foreign-matter image position detection unit 611 (S35).

In a case where the foreign-matter image position detection unit 611 has not detected the foreign-matter image from the image read by the scanner unit 22 (NO in S36), the reading control unit 614 causes the scanner unit 22 to perform the document reading operation for the usual copying operation (S41), and in a case where the foreign-matter image has been detected (YES in S36) and also the control unit 61 has determined the reading stop mode (YES in S37), the reading control unit 614 causes the document conveying unit 21 and scanner unit 22 to stop the document reading operation (S38). The drive control unit 613 then causes the moving mechanism to move the light source 222 and the like to the sub-scanning direction position indicated by the sub-scanning direction position information stored in the storage unit 67 (S39), and the lighting control unit 612 notifies the contamination position on the document glass by lighting control of the light-emitting element groups 200A and 200B in any of the above-described light emission modes (1) to (3) (S40).

As a result, in a case where the document glass is contaminated, the user can grasp the contamination position on the document glass and also grasp the contamination in other locations on the document glass even after the document reading operation has been started.

In a case where the control unit 61 determines that the mode that has presently been set is the foreign-matter image removal mode (NO in S37), if the determination unit 618 determines that the foreign-matter image removal processing of the foreign-matter image is possible (YES in S43), the document reading operation is continued by the reading control unit 614 (S44), and image formation based on the image after the foreign-matter image removal processing has been performed by the image processing unit 615 is performed by the image formation unit 40 (S45, S46). Further, in a case where the determination unit 618 determines that the foreign-matter image removal processing of the foreign-matter image is impossible (NO in S43), the processing flow moves to S38 and the reading control unit 614 causes the document conveying unit 21 and scanner unit 22 to stop the document reading operation.

Figure 11:
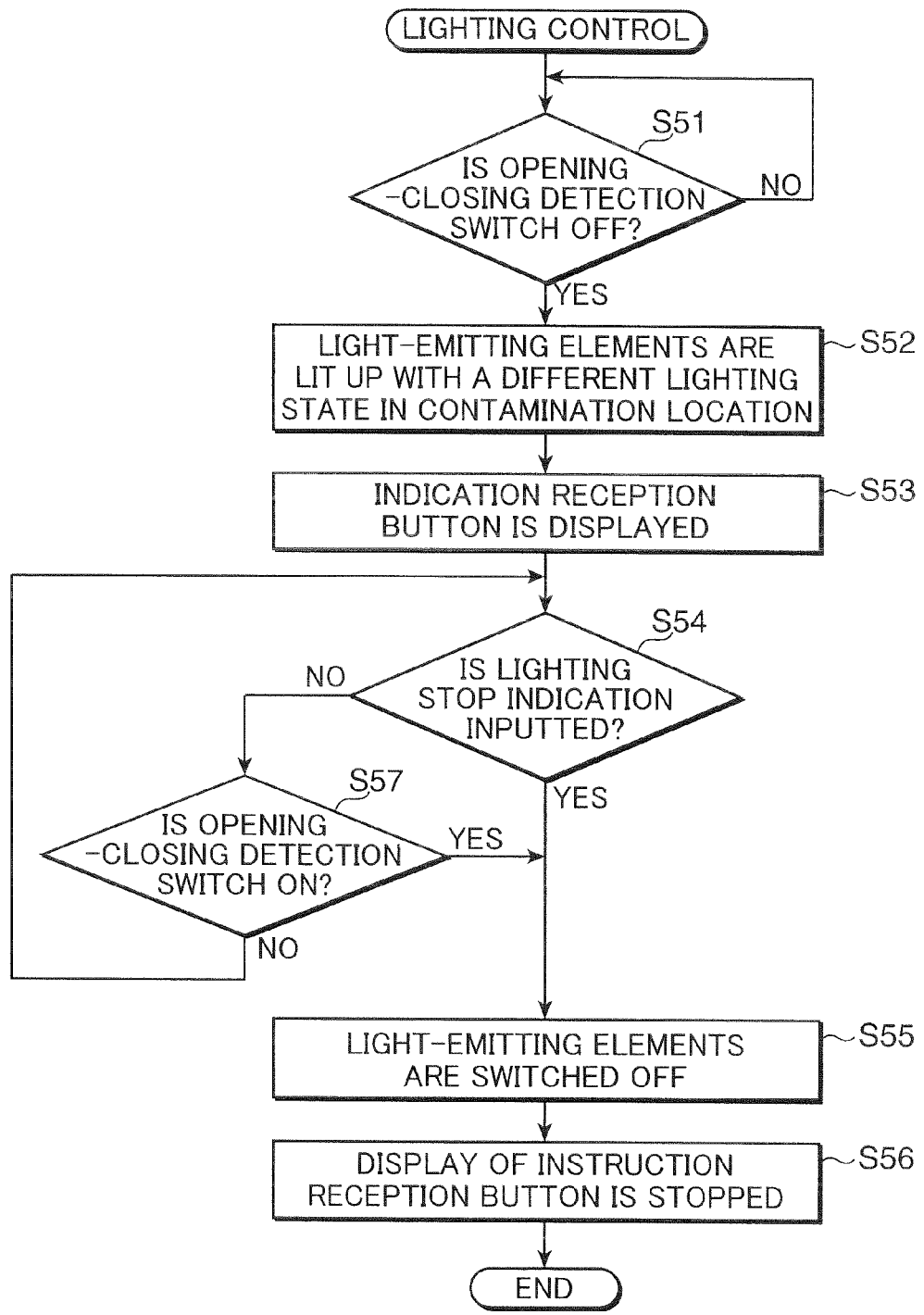
FIG. 11 is a flowchart illustrating the lighting control of the light source in the embodiment of contamination detection embodiment in the multi-function peripheral.
Figure 12:
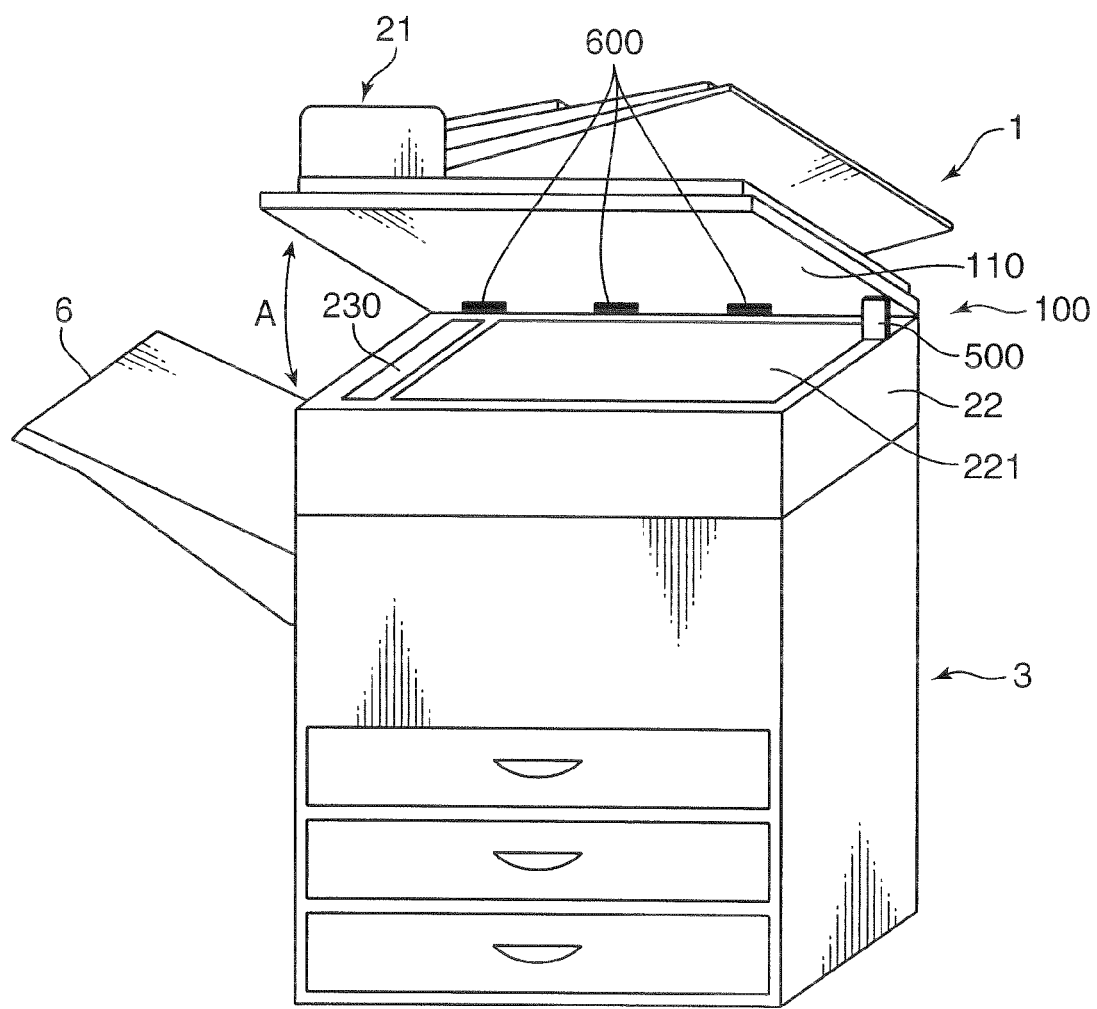
FIG. 12 is a perspective view of multi-function peripheral that illustrates a state in which the document conveying unit is rotated upward.
Figure 13:
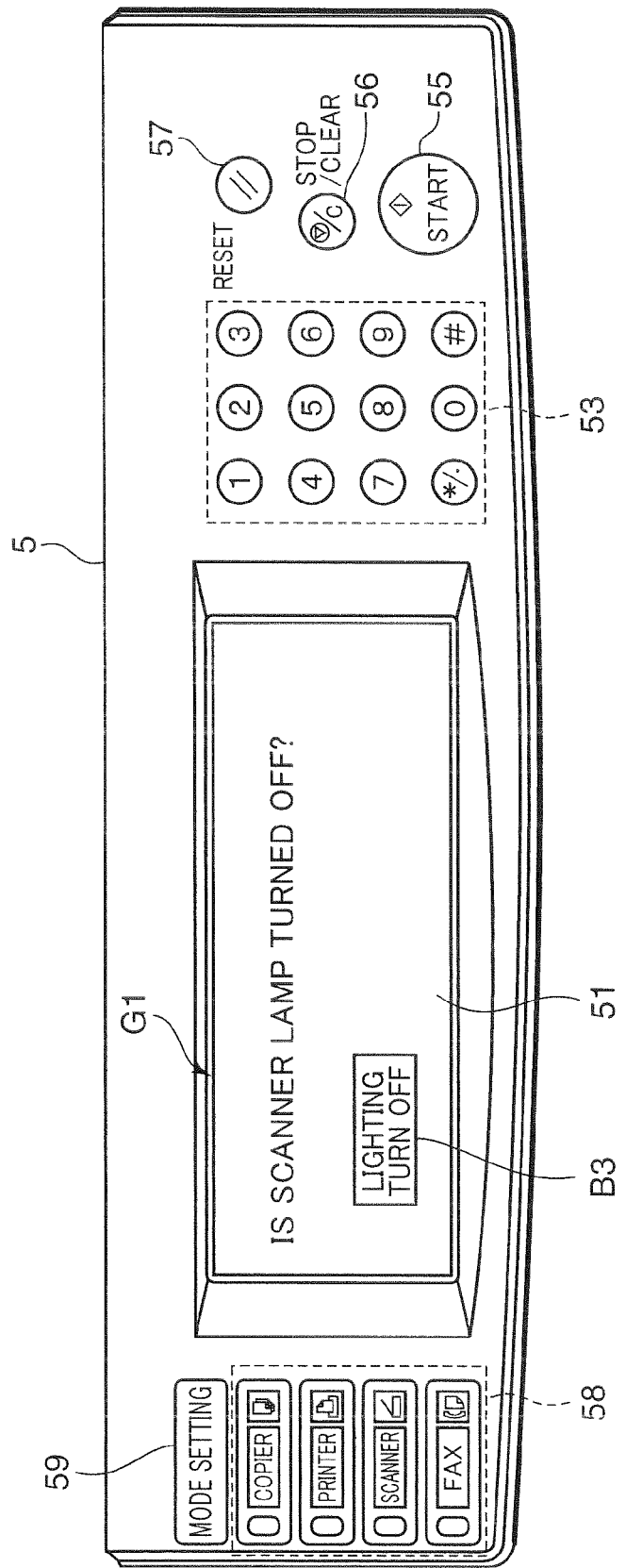
FIG. 13 illustrates a display example of the display unit.

The lighting control of the light source 222 in the above-described contamination detection embodiment performed by the multi-function peripheral 1 will be explained below. FIG. 11 is a flowchart illustrating the lighting control of the light source 222 in the above-described contamination detection embodiment performed by the multi-function peripheral 1. FIG. 12 is a perspective view of the multi-function peripheral 1 showing a state in which the document conveying unit 21 is rotated upward. FIG. 13 illustrates a display example of the display unit 51.

In the multi-function peripheral 1, in a case where the processing of steps S17 and S40 described in the first and second embodiments is conducted, the lighting control unit 612 can perform the lighting control of the light source 222 in the following manner.

The document conveying unit 21 is provided with a rotation mechanism 600 that can open and close the document conveying unit 21 in the direction shown by arrow A in FIG. 12 (direction of coming into contact with and withdrawing from the platen glass 221) by rotation about the rear edge of the document 3 as a rotation axis. An opening-closing detection switch 500 is configured to be switched off when the document conveying unit 21 is withdrawn by the rotation mechanism 600 from the upper surface of the body 3 where the platen glass 221 and the document glass are provided and switched on when the document conveying unit 21 is brought into contact with the upper surface of the body 3 by the rotation mechanism 600. The opening-closing detection switch 500 outputs the signals indicating the ON and OFF state of the switch to the control unit 61 (lighting control unit 612).

In a case where processing of steps S17 and S40 in the first and second embodiments is performed, the lighting control unit 612 determines whether the opening-closing detection switch 500 is switched on or off on the basis of the above-mentioned signals outputted by the opening-closing detection switch 500 (S51). In a case where the opening-closing detection switch 500 is switched off (YES in S51), the lighting control unit 612 notifies the light source 222 about the contamination position on the document glass by the above-mentioned lighting control of the light-emitting element groups 200A and 200B (S52). As shown in FIG. 13, the display control unit 617 then displays at the display unit 51 a lighting turn-off instruction input and reception button B3 that receives a lighting notification end instruction (instruction to end the notification by the lighting control of the light-emitting element groups 200A and 200B of the light source 222) from the user (S53).

Where the lighting notification end instruction is inputted by the user operation of the lighting turn-off instruction input and reception button B3 (YES in S54), the lighting control unit 612 ends the contamination position notification by the lighting control of the light-emitting element groups 200A and 200B (S55). Thus, the lighting control unit 612 turns off the light-emitting elements 200A and 200B of the light source 222. Then, the display control unit 617 stops the display of the lighting turn-off instruction input and reception button B3 at the display unit 51 (S56).

Where the lighting notification end instruction is not inputted by the user by the lighting turn-off instruction input and reception button B3 (NO in S54), the lighting control unit 612 continuous detecting whether the signal of the opening-closing detection switch 500 indicates that the switch is on or off (S57), and where the signal of the opening-closing detection switch 500 is off (NO in S57), the processing flow returns to S54, and where the signal of the opening-closing detection switch 500 is on (YES in S57), the processing flow returns to S55.

With the above-described processing, when the document conveying unit 21 is withdrawn from the document glass (document reading window 230) and the user can see the document glass, the contamination position notification by the lighting control of the light-emitting element groups 200A and 200B during the foreign-matter image detection can be performed at a timing meaningful for the user.

The present invention is not limited to the configurations of the above-described embodiments, and a variety of changes can be made. For example, in the above-described embodiments, the light source 222 is configured to have two rows of light-emitting element groups 200A and 200B shown in FIG. 6, but instead a configuration may be used in which a light-emitting element group of only one row is provided, the lighting control unit 612 lights up all the light-emitting elements of the one-row light-emitting element group, illuminates the document glass, and lights up the light-emitting elements provided in the abovementioned fixed range in the vicinity of the main scanning direction position of the detected foreign-matter image, from among the light-emitting elements of the light-emitting element group, in any of the above-described light emission modes (1) to (3).

In a case where the foreign-matter image is detected and the document reading operation is not performed in the contamination detection on the document glass and contamination notification processing described in the first embodiment, or in a case where the foreign-matter image is detected and the document reading operation is stopped in the second embodiment (S38 in FIG. 10), a configuration may be used in which the drive control unit 613 changes the position of reading with the scanner unit 22 in the ADF reading mode to the sub-scanning direction position to which foreign matter has not adhered on the document reading window 230, this position being detected by the reading position derivation unit 619, and then the reading control unit 614 restarts the document reading operation.

The configurations and processing illustrated by FIGS. 1 to 13 in the above-described embodiments are exemplary and the present invention should not be construed as being limited to the embodiments.

Essentially, the present invention relates to an image reading device including: a document reading unit having an illumination mechanism, which illuminates a document with a group of a plurality of light-emitting elements arranged side by side in a main scanning direction, and reading optically an image of the document illuminated by the illumination mechanism via a document glass that extends in the main scanning direction in a predetermined document reading position; a document conveying unit that conveys the document in a sub-scanning direction of the document reading unit with respect to the document reading position; a foreign-matter image position detection unit that detects a predetermined foreign-matter image from the image read by the document reading unit when the document conveyed by the document conveying unit comes off from the document reading position and detects a main scanning direction position of the foreign-matter image in the main scanning direction; and a lighting control unit that lights up the light-emitting element group arranged in the main scanning direction and lights up the light-emitting elements within a predetermined range from the main scanning direction position of the foreign-matter image in a light emission mode that is different from that of other light-emitting elements when the foreign-matter image is detected by the foreign-matter image position detection unit.

The present invention further relates to the image reading device, wherein in the illumination mechanism, the groups of a plurality of light-emitting elements arranged side by side are provided in two rows arranged in the sub-scanning direction; and in a case where the foreign-matter image is detected, the lighting control unit lights up the light-emitting element group of one row, and with respect to the light-emitting element group of the other row, the lighting control unit lights up, in the different light emission mode, only light-emitting elements located in a predetermined range from the main scanning direction position of the foreign-matter image.

According to the above-described aspects of the invention, in a case where a foreign-matter image is detected by the foreign-matter image position detection unit in the document reading position when the document comes off from the document reading position, the lighting control unit lights up the light-emitting element group arranged side by side in the main scanning direction and lights up the light-emitting elements within a predetermined range from the main scanning direction position in which the foreign-matter image is present in a light emission mode that is different from that of other light-emitting elements. As a result, the foreign-matter image position detection and a reading operation for the foreign-matter image position detection can be performed before the document is read. Therefore, contamination in the document reading position (that is, on the document glass disposed in the document reading position) can be detected at a point in time before the document is read, that is, substantially when the document reading by the document reading unit has not been started. Furthermore, by lighting up the group of light-emitting elements arranged side by side in the main scanning direction, the user can be informed about the contamination state of other zones on the document glass. Moreover, because the light-emitting elements within a predetermined range from the main scanning direction position in which the foreign-matter image is present are lighted up in a light emission mode different from that of other light-emitting elements, the user can be notified about the contamination location on the document glass.

Thus, in the conventional document reading device, the user is notified after the document has been read. Therefore, once the document reading processing has been started, the user will not be aware about the presence of a stripe-like image till the document reading job or copying job is completed. Furthermore, the notification after the document is read cannot provide the user with information relating to the position of contamination on the document glass. In a case of the conventional image reading device in which only the contamination location on the document glass is displayed by lighting, the user does not know the level of contamination in other locations on the document glass. As a result, even zones with a lot of dust can remain without being cleaned. By contrast, in accordance with the present invention, contamination present on the document glass can be detected before the document is read, and the user can be notified about the contamination location on the document glass and contamination state of other locations.

The present invention further relates to the image reading device, wherein the document reading unit that includes the illumination mechanism further includes a moving mechanism capable of moving in the sub-scanning direction, the image reading device further including a storage device that stores information on a sub-scanning direction position of the illumination mechanism in which illumination light does not reach a position at a predetermined distance from the document glass; and a drive control unit that drive controls the moving mechanism, wherein in a case where the foreign-matter image is detected, the drive control unit causes the moving mechanism to move the illumination mechanism into a position indicated by the sub-scanning direction position information, and then the lighting control unit performs lighting control of the light-emitting element group during the foreign-matter image detection.

In accordance with the invention, in a case where the foreign-matter image is detected, the drive control unit causes the movement of the illumination mechanism into the sub-scanning direction position in which illumination light does not reach a position at a predetermined distance from the document glass, and then the lighting control unit performs lighting control of the light-emitting element group during the foreign-matter image detection. Therefore, the position at a predetermined distance from the document glass is set in a position of the user's eyes that is normally assumed to be above the document glass, thereby making it possible to notify the user about the contamination location and other locations on the document glass by the lighting control of the light-emitting element group during the foreign-matter image detection, without dazzling the user.

The present invention further relates to the image reading device, further including a reading control unit that controls a document reading operation of the document reading unit, wherein the reading control unit performs the foreign-matter image position detection and a reading operation by the document reading unit for the foreign-matter image position detection before the document is conveyed by the document conveying unit.

In accordance with the invention, the foreign-matter image position detection and a reading operation with the document reading unit for the foreign-matter image position detection are performed before the document is conveyed by the document conveying unit. Therefore, contamination in the document reading position (on the document glass) can be detected substantially at a point in time before the document is read by the document reading unit.

The present invention relates to the image reading device, further including a reading control unit that controls a reading operation of the document reading unit, wherein in a case where the foreign-matter image is detected after the document reading operation has been started by the document reading unit, the reading control unit causes the document reading unit to interrupt the document reading operation, and then the lighting control unit performs lighting control of the light-emitting element group during the foreign-matter image detection.

In accordance with the invention, where the foreign-matter image is detected after the document reading operation has been started, the reading control unit causes the document reading unit to stop the document reading operation, and then the lighting control unit performs lighting control of the light-emitting element group during the foreign-matter image detection. Therefore, the user can be notified about the contamination location and other locations on the document glass, while avoiding a state in which the document reading operation is continued despite the presence of contamination in the document reading position (on the document glass).

The present invention further relates to the image reading device, further including: an image removal processing unit that removes the foreign-matter image by image processing from a document image that has been read by the document reading unit; and a determination unit that determines whether a removal processing of the foreign-matter image by the image removal processing unit is possible, wherein in a case where the determination unit determines that the image removal processing is possible when the foreign-matter image is detected, the image removal processing unit removes the foreign-matter image from the document image that has been read, and in a case where the determination unit determines that the image removal processing is impossible, the lighting control unit performs lighting control of the light-emitting element group during the foreign-matter image detection.

In accordance with the invention, where the determination unit determines that the foreign-matter image can be removed by image processing, the foreign-matter image removal processing is performed, and where the determination unit determines that the image removal processing is impossible, the lighting control of the light-emitting element group is performed during the foreign-matter image detection. Therefore, for example, where the document glass contamination is such that no effect is produced on printing during copying, the document reading and printing are completed without performing the lighting control of the light-emitting elements during the foreign-matter image detection, and where the document glass contamination can produce an adverse effect on printing during copying, the convenience for the user can be increased, for example by making the user aware about the contamination by the lighting control of the light-emitting elements during the foreign-matter image detection.

The present invention relates to the image reading device, further including: a setting unit that sets the image removal processing unit to perform the removal processing of a foreign-matter image, according to an instruction inputted by a user, wherein in a case where no setting is made to perform by the setting unit the image removal processing, the image removal processing unit does not perform the removal processing of the foreign-matter image, and the lighting control unit performs lighting control of the light-emitting element group during the foreign-matter image detection.

In accordance with the invention, the user can select, as desired, at the setting unit whether or not to perform the foreign-matter image removal processing. Therefore, it is also possible to perform the document reading after actually removing the contamination from the document glass, thereby increasing quality of the image obtained by document reading.

The present invention further relates to the image reading device, wherein the document conveying unit includes: a rotation mechanism that can rotate in a direction of coming into contact with or withdrawing from the document glass; and an opening-closing detection unit that detects an open-close state of the document conveying unit rotated by the rotation mechanism and outputs a signal indicating the open-close state to the lighting control unit; and when the lighting control unit receives from the opening-closing detection unit a signal indicating that the document conveying unit has been rotated by the rotation mechanism in the direction of withdrawing from the document glass and assumed an open state in a case where the foreign-matter image has been detected, the lighting control unit performs lighting control of the light-emitting element group during the foreign-matter image detection.

In accordance with the invention, in a case where the foreign-matter image is detected and the document conveying unit is rotated by the rotation mechanism in the direction of withdrawing from the document glass, the lighting control unit performs lighting control of the light-emitting element group during the foreign-matter image detection. Therefore, it is possible to light up the light-emitting element groups during the foreign-matter image detection at a timing meaningful for the user, for example, to light up the light-emitting element groups during the foreign-matter image detection only when the document conveying unit is withdrawn from the document glass and the user can see the document glass.

The present invention further relates to the image reading device, wherein when the lighting control unit receives from the opening-closing detection unit a signal indicating that the document conveying unit has been brought into contact with the document glass by rotation by the rotation mechanism and assumed a closed state, the lighting control unit stops the lighting control of the light-emitting element group during the foreign-matter image detection and turns off the light.

In accordance with the invention, where the document conveying unit is brought into contact with the document glass by rotation by the rotation mechanism, the lighting control unit stops the lighting control of the light-emitting element group during the foreign-matter image detection and turns off the light. Therefore, when the document conveying unit covers the document glass and comes into contact therewith and the user cannot see the document glass, the light-emitting element group is not lighted up during the foreign-matter image detection and useless light emission from the light-emitting elements can be avoided.

The present invention relates to the image reading device, further including: a display unit that has a touch panel function and displays an instruction input button for receiving from a user an instruction to stop the lighting of the light-emitting element group during the foreign-matter image detection; and a display control unit that drive controls the display unit, wherein the display control unit causes the display unit to display the instruction input button when lighting of the light-emitting elements during the foreign-matter image detection is started by the lighting control unit, and when a lighting stop instruction relating to the light-emitting elements is received from the user via the instruction input button, the lighting control unit stops the lighting control of the light-emitting element group during the foreign-matter image detection and turns off the light.

In accordance with the invention, by inputting the instruction to stop the lighting of the light-emitting element group during the foreign-matter image detection via the instruction input button of the display unit, the user can stop the lighting of the light-emitting element group during the foreign-matter image detection at the desired timing.

The present invention relates to the image reading device, wherein, when the lighting control unit receives from the opening-closing detection unit a signal indicating that the document conveying unit has been brought into contact with the document glass by rotation by the rotation mechanism and assumed a closed state, the lighting control unit stops the lighting control of the light-emitting element group during the foreign-matter image detection and turns off the light, and stops the display of the instruction input button at the display unit.

In accordance with the invention, when the document conveying unit comes into contact with the document glass and the light-emitting element group is turned off, the instruction input button that receives an instruction to stop the lighting of the light-emitting element group is not displayed by the display. Therefore, it is possible not to display at the display unit the instruction input button that is useless to the user.

The present invention relates to an image forming apparatus including: the image reading device according to the invention; and An image forming unit that performs image formation on a recording medium on the basis of a document image that has been read by the document reading unit.

This application is based on Japanese Patent application serial No. 2008-192353 filed in Japan Patent Office on Jul. 25, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading device comprising:
   a document reading unit having an illumination mechanism that illuminates a document, the illumination mechanism having first and second groups of light-emitting elements, each of said groups including a plurality of light-emitting elements arranged in a row along a main scanning direction, said first and second groups being arranged side by side in a sub-scanning direction that is orthogonal to said main-scanning direction, and said document reading unit reading optically an image of the document illuminated by the illumination mechanism via a document glass that extends in the main scanning direction in a predetermined document reading position;
   a document conveying unit that conveys the document in the sub-scanning direction of the document reading unit with respect to the document reading position;
   a foreign-matter image position detection unit that detects a predetermined foreign-matter image from the image read by the document reading unit when the document conveyed by the document conveying unit comes off from the document reading position and detects a main scanning direction position of the foreign-matter image in the main scanning direction; and
   a lighting control unit that lights up, in a first light emission mode, those light-emitting elements of the first group that are within a predetermined range from the main scanning direction position of the foreign-matter image; and lights up, in a second light emission mode that is different from the first light emission mode, those light-emitting elements in the first and second groups other than the light emitting elements in the first group that are within said predetermined range when the foreign-matter image is detected by the foreign-matter image position detection unit.

2. The image reading device according to claim 1, wherein the document reading unit that includes the illumination mechanism further includes a moving mechanism capable of moving in the sub-scanning direction,
   the image reading device further comprising:
   a storage device that stores information on a sub-scanning direction position of the illumination mechanism in which illumination light does not reach a position at a predetermined distance from the document glass; and a drive control unit that drive controls the moving mechanism, and wherein in a case where the foreign-matter image is detected, the drive control unit causes the moving mechanism to move the illumination mechanism into a position indicated by the sub-scanning direction position information, and then the lighting control unit performs lighting control of the first group of light-emitting elements during the foreign-matter image detection.

3. The image reading device according to claim 1, comprising a reading control unit that controls a document reading operation of the document reading unit, wherein the reading control unit performs the foreign-matter image position detection and a reading operation by the document reading unit for the foreign-matter image position detection before the document is conveyed by the document conveying unit.

4. The image reading device according to claim 1, comprising a reading control unit that controls a reading operation of the document reading unit, wherein in a case where the foreign-matter image is detected after the document reading operation has been started by the document reading unit, the reading control unit causes the document reading unit to interrupt the document reading operation, and then the lighting control unit performs lighting control of the first group of light-emitting elements during the foreign-matter image detection.

5. The image reading device according to claim 1, further comprising:

an image removal processing unit that removes the foreign-matter image by image processing from a document image that has been read by the document reading unit; and a determination unit that determines whether a removal processing of the foreign-matter image by the image removal processing unit is possible, wherein in a case where the determination unit determines that the image removal processing is possible when the foreign-matter image is detected, the image removal processing unit removes the foreign-matter image from the document image that has been read, and in a case where the determination unit determines that the image removal processing is impossible, the lighting control unit performs lighting control of the first group of light-emitting elements during the foreign-matter image detection.

6. The image reading device according to claim 5, further comprising a setting unit that sets the image removal processing unit to perform the removal processing of a foreign-matter image, according to an instruction inputted by a user, wherein in a case where no setting is made by the setting unit to perform the image removal processing, the image removal processing unit does not perform the removal processing of the foreign-matter image, and the lighting control unit performs lighting control of the first group of light-emitting elements during the foreign-matter image detection.

7. The image reading device according to claim 1, wherein the document conveying unit comprises:

a rotation mechanism that can rotate in a direction of coming into contact with or withdrawing from the document glass; and an opening-closing detection unit that detects an open-close state of the document conveying unit rotated by the rotation mechanism and outputs a signal indicating the open-close state to the lighting control unit, and wherein when the lighting control unit receives from the opening-closing detection unit a signal indicating that the document conveying unit has been rotated by the rotation mechanism in the direction of withdrawing from the document glass and assumed an open state in a case where the foreign-matter image has been detected, the lighting control unit performs lighting control of the first group of light-emitting elements during the foreign matter-image detection.

8. The image reading device according to claim 7, wherein when the lighting control unit receives from the opening-closing detection unit a signal indicating that the document conveying unit has been brought into contact with the document glass by rotation by the rotation mechanism and assumed a closed state, the lighting control unit stops the lighting control of the first group of light-emitting elements during the foreign-matter image detection and turns off the light.

9. The image reading device according to claim 7, further comprising:

a display unit that has a touch panel function and displays an instruction input button for receiving from a user an instruction to stop the lighting of the light-emitting element group during the foreign-matter image detection; and a display control unit that drive controls the display unit, wherein the display control unit causes the display unit to display the instruction input button when lighting of the light-emitting elements during the foreign-matter image detection is started by the lighting control unit, and when a lighting stop instruction relating to the light-emitting elements is received from the user via the instruction input button, the lighting control unit stops the lighting control of the first group of light-emitting elements during the foreign-matter image detection and turns off the light.

10. The image reading device according to claim 9, wherein when the lighting control unit receives from the opening-closing detection unit a signal indicating that the document conveying unit has been brought into contact with the document glass by rotation by the rotation mechanism and assumed a closed state, the lighting control unit stops the lighting control of the first group of light-emitting elements during the foreign-matter image detection and turns off the light, and stops the display of the instruction input button at the display unit.

11. An image forming apparatus comprising:

the image reading device according to claim 10; and an image forming unit that performs image formation on a recording medium on the basis of a document image that has been read by the document reading unit.

12. An image forming apparatus comprising:

the image reading device according to claim 1; and an image forming unit that performs image formation on a recording medium on the basis of a document image that has been read by the document reading unit.

* * * * *